United States Patent
Lee et al.

(10) Patent No.: US 7,091,288 B2
(45) Date of Patent: Aug. 15, 2006

(54) POLYMERIZATION OF VINYLIDENE FLUORIDE ($VF_2$) IN A SUPERCRITICAL FLUID MEDIUM

(75) Inventors: Sunggyu Lee, Columbia, MO (US); H. Bryan Lanterman, Columbia, MO (US); Abhay Sardesai, Columbia, MO (US); Jonathan Wenzel, Columbia, MO (US); Benjamin Marshall, Columbia, MO (US); Jeffrey Hsing-Gan Yen, Woolwich Township, NJ (US); Ramin Amin-Sanayei, Collegeville, PA (US); Maria Moucharik, LeHavre (FR)

(73) Assignee: Arkema Inc., Philadelphia, PA (US)

( * ) Notice: Subject to any disclaimer, the term of this patent is extended or adjusted under 35 U.S.C. 154(b) by 0 days.

(21) Appl. No.: 10/954,800

(22) Filed: Sep. 30, 2004

(65) Prior Publication Data

US 2006/0069223 A1 Mar. 30, 2006

(51) Int. Cl.
*C08F 2/00* (2006.01)

(52) U.S. Cl. .................. 526/65; 526/89; 526/242; 526/250; 526/255

(58) Field of Classification Search ........... 526/65, 526/89, 242, 250, 255
See application file for complete search history.

(56) References Cited

U.S. PATENT DOCUMENTS

| | | | |
|---|---|---|---|
| 6,716,945 B1 * | 4/2004 | DeSimone et al. | 526/255 |
| 6,734,264 B1 * | 5/2004 | Amin-Sanayei | 526/82 |
| 2004/0087741 A1 * | 5/2004 | Blaude et al. | 526/65 |
| 2004/0162404 A1 * | 8/2004 | DiSimone et al. | 526/255 |

FOREIGN PATENT DOCUMENTS

WO WO-01/90206 A2 * 11/2001

* cited by examiner

*Primary Examiner*—David W. Wu
*Assistant Examiner*—Henry S. Hu
(74) *Attorney, Agent, or Firm*—Thomas F. Roland

(57) ABSTRACT

Polymerization of fluoroolefin monomers proceeds in a supercritical carbon dioxide solvent at high monomer loading levels to provide a high molecular weight polymer with low polydispersity and/or a unimodal molecular weight distribution.

41 Claims, 10 Drawing Sheets

POLYMERIZATION OF VINYLIDENE FLUORIDE (VF$_2$) IN A SUPERCRITICAL FLUID MEDIUM

BACKGROUND

1. Field of the Invention

The invention relates generally to fluoropolymers and methods of polymerizing fluoroolefins in a supercritical fluid reaction medium.

2. Description of the Related Art

Polymerized fluoroolefins are conventionally manufactured via emulsion polymerization processes. These processes are conceptually straightforward; however, significant complications are associated with heat and/or mass transfer control in the reactor. From an operational standpoint, the process is very sensitive to heat and mass transfer conditions which, if improperly controlled, can potentially lead to temperature runaway and pressure aborts. Accordingly, the product has a limited range of molecular weight—typically lower than 300,000—with a wide molecular weight distribution that is indicated by a polydispersity index higher than 5. It is further problematic that the reaction product contains a large amount of gel and microgel. Gel formation may necessitate cleaning of the solids, in additional process steps with commensurate reduction of process efficiency. Due to the emulsifying medium, which is typically water, the wet polymer product must proceed through complex finishing processes that include filtration and drying.

The polydispersity index is a measure of the distribution of molecular weights. The polydispersity index is calculated as the weight-average molecular weight divided by the number average molecular weight. As polymer chains approach a uniform chain length, the polydispersity index approaches unity or a value of one. Typical polydispersity indexes vary based on the mechanism of polymerization and can be affected by a variety of reaction conditions. A low polydispersity index indicates a uniform polymer material and a reaction mechanism does not have a tendency to chain-terminate.

To address the foregoing problems with emulsified reaction systems, some efforts have been made to synthesize polymers from their monomeric reactants in supercritical media. Fluids existing at states above critical temperature and pressure are called supercritical fluids. Any fluid may exist and function as a supercritical fluid, provided the temperature and pressure conditions exceed the critical values.

Most of the supercritical polymerization efforts involve polymerization of fluoropolymers and acrylics. For example, U.S. Pat. No. 6,340,722 issued to Lee et al. reports the production of polymethacrylate in supercritical media.

For example, liquid or supercritical $CO_2$ is used in a reaction media with tetrafluoroethylene (TFE) as reported in U.S. Pat. Nos. 5,618,894; 5,674,957; 5,939,501; 5,939,502; and 5,981,673 issued to DeSimone et al. The process conditions exist over a wide range of temperatures and pressures without regard to consequent effects on polymer molecular weight and polymer morphology. While the reactions proceed fairly well for TFE, copolymers of VF$_2$ are typically gummy. Japanese Patents 45,003,390 and 46,015,511 describe polymerization of TFE in $CO_2$ media with use of $^{60}Co$ γ-rays to initiate polymerization, as opposed to using a chemical-type free radical initiator. The radiation-initiated TFE polymerization reaction may be carried out at temperatures between −70° C. and +80° C.

Other fluoropolymers have been made in $CO_2$ media, for example, as reported in U.S. Pat. No. 5,496,901 issued to DeSimone. A 1,1-dihydroperfluorooctyl acrylate material is polymerized and co-polymerized using aazobisisobutyronitrile (AIBN) as a free radical initiator. In addition, low molecular weight amorphous fluoroolefins are polymerized in the presence of $C_4F_9I$ and UV light. All polymerizations are carried out in homogeneous solutions comprised of $CO_2$, monomers, and resultant polymer. The process conditions exist over a wide range of temperatures and pressures without regard to consequent effects on polymer molecular weight and polymer morphology.

U.S. Pat. No. 5,496,901 describes polymerization of water-insoluble polymers in aqueous phase in the presence of $CO_2$. Different monomers are polymerized using different initiators in the presence and in the absence of fluorosurfactant with emphasis on preserving a ratio where TFE:$CO_2$ is 50:50. The monomer is polymerized using $K_2S_2O_8$. However, polymerization of water-insoluble polymers in aqueous media in the presence of $CO_2$ results in a dispersion of resin in the aqueous media, which circumstance is ultimately similar to the conventional emulsion or suspension polymerization and provides no apparent advantage over the art.

U.S. Pat. No. 5,739,223 issued to DeSimone describes a method of making fluoropolymers using a two-stage reaction process with each stage conducted at a different temperature. The process conditions exist over a wide range of temperatures and pressures without regard to consequent effects on polymer molecular weight and polymer morphology.

U.S. Pat. No. 6,051,682 issued to Debrabander et al. proposes a continuous polymerization system to replace batch polymerization using $CO_2$ as the polymerization media. In the proposed process, polymerization is carried in a continuously stirred tank reactor and the resultant polymer is collected in downstream filters. All examples pertain to TFE/PPVE with no teaching about VF$_2$ polymerization. Moreover, no information is reported or claimed regarding molecular weight or molecular weight distribution of resultant polymers. The process conditions exist over a wide range of temperatures and pressures without regard to consequent effects on polymer molecular weight and polymer morphology.

WO0190206 to DeSimone et al. describes production of fluoropolymers with a multimodal molecular weight distribution. There is no teaching of how to make high molecular weight polymer with a unimodal molecular weight distribution. U.S. Patent Application 2002/0040118 A1 to DeSimone describes similar production of fluoropolymers with a multimodal molecular weight distribution. The polymer has a low average molecular weight typically lower than 200,000, a multimodal molecular weight distribution, and non-controllable morphology. The process utilizes very few initiators, which incidentally do not work particularly well as indicated in part by a monomer conversion of less than 20%.

U.S. Pat. Nos. 5,674,957 and 5,618,894 issued to DeSimone et al. disclose the use perfluorinated free radical initiators, mainly hexafluoropropylene (HFPO) dimer, in making fluoropolymers. Monomer may be dissolved in CFC-113, to produce polymers in $CO_2$ media with stable (fluorinated) chain ends. The polymerization yields and average molecular weights of the resultant polymers are very low, except for the case when TFE is used as a co-monomer. When $VF_2$ is used as co-monomer, a gummy polymer of very low molecular weight is obtained with yields less than 10%.

U.S. Pat. No. 6,103,844 issued to Brothers describes the use of dialkyl(2,2'-azobisisobutyrate) as an initiator in polymerization of TFE and also of $VF_2$ in $CO_2$ media. Other azo compounds, such as 2,2'-azobisisobutyronitrile(AIBN) or 2,2'-azobis(2,2-dimethylpentanitrile) are generally not effective initiators for fluoropolymers. These azo compounds are solids at ambient conditions; however, no information about their states under polymerization conditions is provided.

WO0146275 to Brown et al. describes a process of making oligomers and telomers of fluoromonomers in $CO_2$. The fluoromonomers are principally TFE. The reaction occurs in the presence of a chain transfer agent, such as HBr and/or HCl. The initiator for telomerization is principally HFPO dimer, which is an ineffective initiator for $VF_2$ polymerization.

Some patents describe the synthesis of polyvinylidine difluoride (PVDF) in a supercritical medium, for example, as in U.S. Pat. Nos. 5,496,901; 5,688,879; 5,739,223; 5,863,612; 5,922,833 issued to DeSimone. Analysis of prior processes for $VF_2$ polymerization with use of supercritical $CO_2$ reveals the following problems:

Pressure. Use of very high pressure results from attempts to synthesize polymers above or near the resultant polymer's cloud point in supercritical carbon dioxide. The required pressures are sometimes commercially impracticable, e.g., as in the case of a 45,000 psi process or a 10,000 psi process.

Monomer concentration. $VF_2$ monomer loading is low—typically less than only a few percent of the supercritical fluid medium. With a low monomer loading in supercritical carbon dioxide at excessively high pressures, the chances for interactions of monomer-oligomer, monomer-monomer and monomer-initiator are significantly lowered by the dominating population of carbon dioxide molecules in the system. There is premature termination of free radicals.

Ratio of monomer to solvent. Because of the pressure and monomer concentration issues discussed immediately above, the relative concentration ratio between the fluoromonomer and the solvent is kept low, which in turn affects the product quality as well as the process efficiency, as is also explained above.

Supercritical solvent effects. There is a failure to understand and implement the use of reagents as cosolvents at supercritical reactions conditions, especially to investigate the possible effects of $CO_2$ and $VF_2$ as cosolvents to solubilize polymer reaction product and initiator when $VF_2$ is a reagent. Therefore, the processes are operated more strictly as a precipitation polymerization from the beginning to the end of the reaction.

Initiator choices. There is a very narrow selection among initiator choices, and the initiators do not work particularly well. There is initiator involvement in reaction mechanism with consequent chain branching and chain termination effects leading to less desirable products. Selections do not include use of free radical initiators that are more common and less expensive. The choice of initiator is not based on reaction kinetics or mechanisms.

Polymer weight. Low molecular weight polymers result from these processes. The average molecular weight of product polymer is substantially lower than that of the conventional emulsion polymerization process.

Use of a stabilizer chemical or a fluoro-surfactant. These materials are unable to sustain continuing chain growth in $CO_2$—$VF_2$ systems. There may be formation of undesirable foam. The art commonly uses stabilizers and/or fluoro-surfactants for polymer chain growth as well as for product particle morphology.

Gummy product. There is formation of gels and microgels, such that the reactions do not directly result in gel-free free-flowing powder and additional process steps are required to harvest clean solids. The existence of gel or microgel is an indirect proof of the negative effect of melt processing or solution processing of product polymer. Further, it also provides an indirect proof for entrapment of inhomogeneous species inside the polymeric matrix/phase, e.g., solvent initiator, its fragmented derivatives, unreacted monomer, and interpenetrating network of oligomers and low weight fluoropolymers. Therefore, the product is impure and inferior not only from the material property standpoint, but also from the further processing aspect.

Product morphology controls. The references do not describe a control strategy to benefit product morphology.

Molecular weight controls. Besides the low molecular weight polymers, there is poor control over polymer molecular weight distribution. The processes are not selectively controllable to produce polymer with a desired molecular weight.

Inferior polydisperse product. The molecular weight distribution is multimodal, proving that the degree of polymerization is never under control. The resultant product is, therefore, significantly inferior.

Inability to achieve high molecular weight polymer. The references do not describe how to make polymer with high or medium molecular weight. The molecular weights, even in the best possible cases, are substantially lower than those of the conventional emulsion polymerization products. Thus, the polymer products are inferior to hose produced by emulsion processes.

Low process yields. The polymerization yield is low and the monomer conversion is also low, thus making the process operate in a high recycle mode and worsening the process economics.

SUMMARY

A fluoropolymer synthesis advances the art and overcomes the problems outlined above by providing a controllable supercritical reaction process that may produce, for example, a high molecular weight fluoropolymer generally having a unimodal molecular weight distribution and low polydispersity. The process utilizes high monomer or co-monomer loading in a supercritical solvent, such as carbon dioxide. Exceptionally high molecular weight polymers may be obtained at high efficiency of monomer conversion.

In one embodiment, a process or system reacts a fluoroolefin monomer or comonomer to form a polymer. An operator or electronic control system—generally a controller—feeds solvent to a reactor vessel. The solvent is essentially non-reactive with the fluoroolefin and has a critical temperature less than a melting point of the desired polymer reaction product. The reactor vessel receives at least one fluoroolefin monomer so that, in combination, the total monomer concentration is at least twenty percent by weight of the monomer-carbon dioxide mixture. The controller establishes a reactive state for polymerization reaction in the reactor vessel, such that temperature is above a critical temperature of the solvent and less than a melting point of a desired polymer product, and pressure ranges from 50 atm to 450 atm. The controller introduces an initiator into the reactor to form a reaction mixture. The reaction proceeds in the reactive state to effect free radical polymerization. Depressurization of the reactor vessel facilitates recovery of the polymer reaction product, which is usually in the form of a gel-free, free-flowing powder. Particularly preferred materials include the use of vinylidene fluoride monomer, which in some process embodiments may be supplemented up to 50% with a free-radical reactive comonomer, and carbon dioxide solvent.

The product is an essentially pure fluoropolymer that is free from carbon dioxide, free radical initiator, and other impurities, for example, where these impurities constitute less than one or two percent of the polymer. The polymer product has, for example, a molecular weight ranging from 150,000 to 1,500,000 g/mol that is selectively controlled by selecting conditions of the reactive state in the reactor within design parameter ranges, by selecting the type and amount of initiator, and by selectively adjusting the total monomer concentration in the reactor. The polymer molecular weight may be unimodally distributed and/or have a low polydispersity ranging from 1.3 to 6.0. The polymer may have a high crystallinity, e.g., a crystallinity equal to or greater than 40%, or equal to or greater than 50% crystallinity.

In preferred embodiments, the polymer product has a unimodal molecular weight distribution. As defined herein, a mode is a discrete peak on a histogram showing frequency of molecular occurrence by molecular weight distribution, or an equivalent method of determining molecular weight distribution. In real-world molecular weight histogram analysis, there sometimes arise minor or insignificant peaks that may be considered noise or insignificant aberrations in the data or product. For example, an insignificant aberration may include a concave down to concave change on a continuous frequency distribution that is not the maximum frequency value and represents a less abundant peak where the concave down portion of the less abundant peak rises over an interval having an extent that is less than ten percent of the maximum frequency value. The extent of rise for the less abundant peak is determined from the point of inflection proximate the maximum frequency peak to the less abundant peak value. Unless indicated otherwise below, the term "unimodal distribution" means a molecular weight distribution having a single peak frequency that include maximum frequency of occurrence together with any insignificant aberrations that are not clearly detached in occurrence from the peak frequency or where the insignificant aberrations persist at frequencies less than ten percent of the maximum peak frequency.

By way of example, in the case of PVDF, average molecular weight of the polymer may range from 500,000 to 1,500,000 g/mol with a unimodally distributed polydispersity index ranging from 2.5–6.0. Significantly, the process may be used to provide PVDF molecular weights exceeding 1,000,000 g/mol, and these polymers may also have high crystallinity. In other embodiments, PVDF of average molecular weight ranging from 150,000 to 500,000 may be unimodally distributed with a polydispersity index ranging from of 1.3–3.0. The PVDF polymer may have a crystallinity is in excess of 40%, and more preferably in excess of 50%. The high molecular weight and high crystallinity may be reflected in a relatively high melting point of the resultant polymer, which generally exceeds 160° C., frequently exceeds 165° and may even exceed 166° C.

The PVDF polymers may be used to make pultrusion coatings for use on buildings and structures to resist weather, salt, and water. Additionally, the PVDF polymers may be used as electrical insulation and to make ducting, as well as other conventional uses for PVDF polymers.

DETAILED DESCRIPTION

Figure 1:
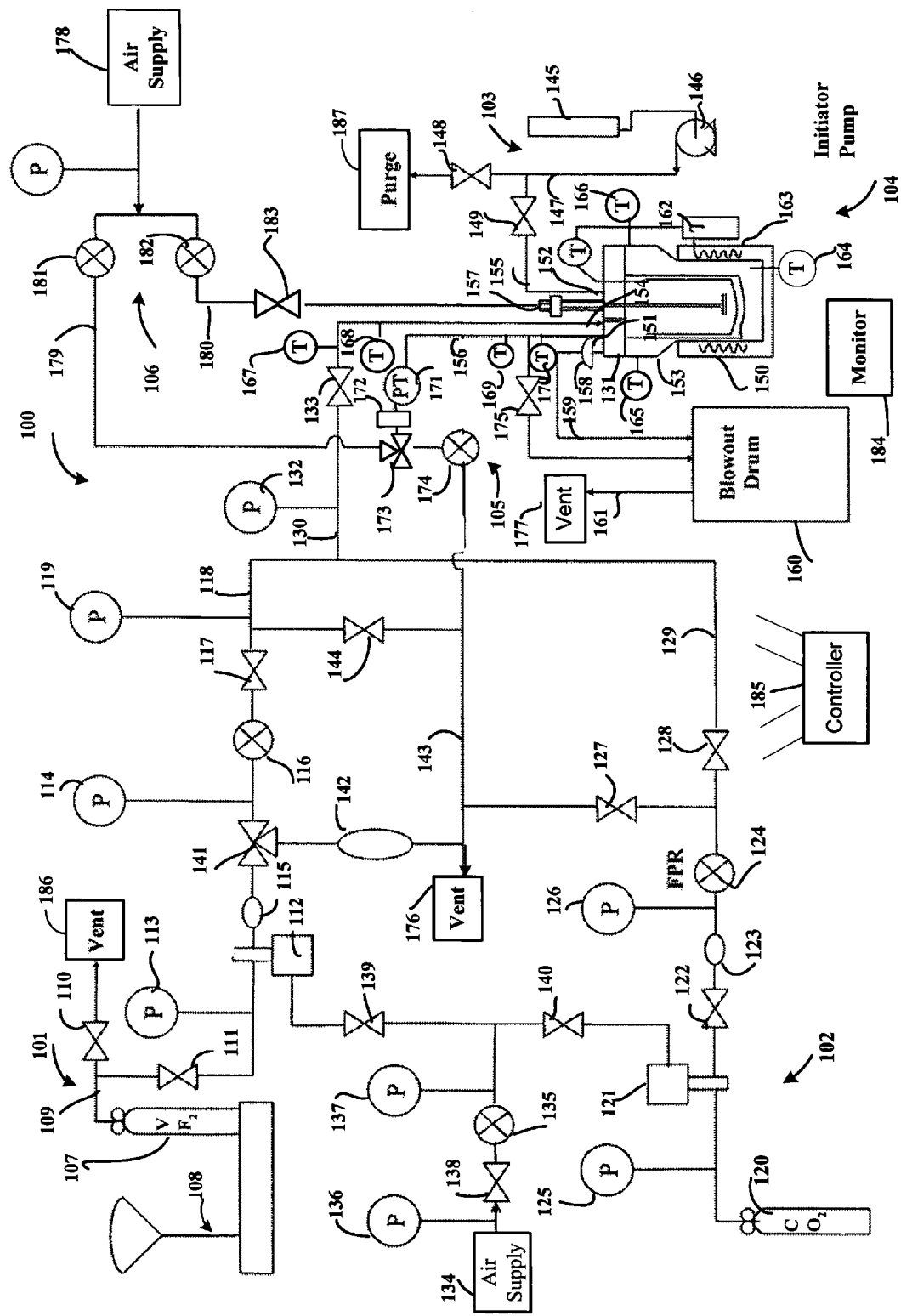
FIG. 1 is a schematic diagram of process equipment for use in making fluoropolymers under supercritical reaction conditions.

Supercritical fluids possess unique physico-chemical properties that may not readily ascertainable from their subcritical counterparts. Beneficial properties of supercritical fluids may include high diffusivity, low viscosity, controllable solvent density, and extraordinary solvent power.

The first two properties are "gas-like", whereas the last two are more "liquid-like." Table 1 exemplifies a striking comparison of physico-chemical properties between supercritical water and ambient water. The compared properties are nearly opposite, as illustrated.

TABLE 1

AMBIENT WATER VS. SUPERCRITICAL WATER

| Nature of Property | Ambient Water | Supercritical Water |
|---|---|---|
| Temperature, ° C. | 25° C. | >374° C. |
| Pressure, atm | 1 atm | >218.2 atm |
| Organic Solubility | Negligible | Very High |
| Inorganic Solubility | Very High | Negligible (Very Low) |
| Density | High (Not controllable) | M–H (Controllable) |
| Viscosity | High | Low |
| Diffusivity | Low | High |
| Dielectric Constant | 80 | 5.7 @ Critical Point |
| Corrosivity | Not | Somewhat |
| Polarity | Highly Polar | Low |
| Oxidation | Fire Extinguishing | Combustion Medium |
| Oxygen Solubility | 9.2 mg/L | Very High (in any proportion) |

While water shows dramatic differences in the properties between ambient and supercritical water, differences in the properties of carbon dioxide between ambient and supercritical fluid are more subtle. Table 2 shows a comparison of physico-chemical properties between ambient carbon dioxide and supercritical carbon dioxide. As shown in Table 2, supercritical carbon dioxide has numerous advantages that can be exploited for processing polymeric materials and carrying out polymerization reactions.

TABLE 2

AMBIENT CARBON DIOXIDE VS. SUPERCRITICAL CARBON DIOXIDE

| Nature of Property | Ambient $CO_2$ | Supercritical $CO_2$ |
|---|---|---|
| Temperature, ° C. | 25° C. | >31.4° C. |
| Pressure, atm | 1 atm | >72.9 atm |
| Organic Solubility | Negligible | Very High |
| Inorganic Solubility | Negligible | Enhanced |
| Density | Low (Not controllable) | M–H (Controllable) |
| Viscosity | Low | Low |
| Diffusivity | High | High |
| Swelling of Polymer | No | Yes |
| Softening of Polymer | No | Yes |
| Effective Glass Transition Temperature of Polymer | About Same as that in Air | Substantially Lowered |
| Solubility of Fluoropolymers | Negligible | High |
| Reactiveness/Inertness in Polymer Processing | Inert | Inert |

Supercritical fluids may be used as selective solvents, swelling agents, foaming agents, oxidation media, and reaction media in a wide variety of chemical processes. Even though all fluids can be at least theoretically used as supercritical fluids, carbon dioxide and water are most frequently considered for use in commercial implementation. Carbon dioxide has a low critical temperature (31.4° C.) and mild critical pressure (72.9 atm), yet is nontoxic, inexpensive, and organic-friendly. Water has a high critical temperature (371° C.) and pressure (218 atm). However, supercritical water has outstanding solubilities towards most organics (including macromolecules) and oxygen. These two supercritical solvents may provide good process environments for a variety of chemical applications. Solvent uses of supercritical fluids constitute the majority of applications for such purposes as selective extraction, separation, and purification.

Other properties render supercritical fluids well suited for advanced polymer synthesis and material processing. Advantages include:

Selectively controllable density may range between 0.1 and 1.0 g/cc. Density of the fluid can be varied simply by changing the pressure and temperature conditions. Further, the density of a supercritical fluid is orders of magnitude greater than that of its gaseous counterpart.

Increased diffusivity of other molecules in the supercritical fluid leads to improved reaction kinetics. Molecular diffusivity in a supercritical fluid is orders of magnitude greater than that of its liquid counterpart.

Supercritical fluids have lower viscosity than their liquid counterparts. The lower viscosity facilitates mixing operations and provides less flow resistance in mass transfer.

Supercritical reaction systems may be enhanced by co-solvent effects. The supercritical fluid system can be synergistically altered by adding a second fluid as a co-solvent. The choice and composition of a co-solvent may drastically change the nature of the resultant solvent system, for example, to improve co-solvent activity when the reagent is also considered as a solvent compared to a pure solvent counterpart. Carbon dioxide is an excellent host solvent due to its low critical points and relative inertness in reactive polymerization environments.

In one synthesis, the reactor is fed with predetermined amounts of $CO_2$ and $VF_2$. Once the reactor is brought to the desired temperature and pressure conditions, an initiator solution of a predetermined amount is introduced into the reactor, with agitation provided to distribute the initiator. This time is recorded as the beginning of the reaction, since polymerization starts upon initiator introduction. The reaction rate is monitored by observing the pressure in the reactor. As the monomer is consumed, the reactor pressure decreases. $VF_2$ is fed to maintain the reactor pressure after reactive consumption of $VF_2$ appears in the pressure profile of the ongoing reaction. The reaction proceeds for a predetermined duration, which is generally 0.2 to 6 hours, and more preferably from 1–3 hours depending upon the initiator types and other reaction conditions chosen. At the end of the reaction, the reactor is depressurized and allowed to cool in a predetermined manner that affects the final product morphology.

The temperature of the process may be chosen based on the activation temperature of the free radical initiator that is used for the process. To assist selection of the free radical initiator where thermal activation is desired, the upper bound for the temperature may be the desired polymer product's melt temperature, e.g., approximately 165° C. in the case of PVDF. The lower bound for the temperature may be the critical point of carbon dioxide, i.e., 31.4° C., or the critical temperature of another solvent. Thus, the temperature condition of the process assures that the synthesis reaction takes place without mass transfer limitations in steps involving free radical initiation and chain transfer. The free radical initiator is preferably dissolved in the supercritical fluid mixture, e.g., $CO_2$—$VF_2$, and optimally active at a chosen temperature. The resultant polymer product is preferably not subjected to melt processing conditions in the reactive state for polymerization.

The reactive state for the synthesis may benefit from establishing a combination of condition values selected according to three principal constraints. One of the constraints that may be imposed is a pressure constraint. Where a supercritical fluid is used, the reaction pressure should exceed the critical pressure of the supercritical fluid and/or the reaction mixture. In the case of PVDF synthesis, the reaction mixture is principally comprised of carbon dioxide and $VF_2$. The second constraint is one of monomer (or co-monomer) concentration. The concentration should be high enough to assure that the average intermolecular distance between two adjacent monomer molecules is sufficiently short to result in uninhibited chemical reaction. This concentration may be significantly greater than concentrations that are typical of the prior art, which has generally failed to appreciate the amount of fluoroolefin that may be dissolved in supercritical carbon dioxide.

The third constraint relates pressure to concentration. Without being bound by theory, this is a population density requirement placing monomer molecules in a spatially dense (but not too dense) arrangement where there is also a high ratio of monomer concentration to carbon dioxide concentration in the reaction mixture. This arrangement induces favorable monomer to monomer interactions and/or collisions without excessive hindrance from carbon dioxide molecules. Pressure conditions that meet these requirements suitably range from 50 atm to 450 atm, and are more preferably from 73 atm to 300 atm. An excessively high pressure condition coupled with low monomer loading is detrimental to the process, even though these conditions potentially facilitate dissolving some product polymer of lower molecular weight. In such an excessively high pressure condition, the monomer-monomer collision/interaction is much less frequent than the monomer-$CO_2$ collision/interaction, and the same is also true for the initiator-monomer interaction. Thus, pressure that is too high tends to interfere with all aspects of radical formation and chain transfer, which becomes extremely inefficient as indicated by an increased need for reaction time and/or low monomer conversion.

For effective polymerization and high yields in the case of PVDF synthesis, the minimum $VF_2$ loading is at least about 20% by weight of the $VF_2$—$CO_2$ mixture, and is preferably higher than 30% by weight. The lower bound for the $VF_2$ concentration exists because the reaction mixture advantageously uses the monomer itself as a co-solvent that drastically enhances the solubility of all ingredients including oligomers, polymers, and free radical initiator. Even though the theoretical upper bound is not capped, the practical upper bound for the monomer loading percentage is associated with the controllability of reaction, associated heat of reaction, and resultant product polymer morphology and desired molecular weight distribution. Therefore, the preferred bounds for the monomer loading is from 30% to 70% by weight, and more preferably in the range of 40%–60% by weight. Process yields combining selected conditions as described above may reflect monomer conversion in the range from 40% to 90% or more of the monomer. The higher yields are facilitated by extending the reaction time and increasing the initiator feed.

The initiator type and amount affect the optimal operating temperature, as well as specific polymerization reaction mechanisms. The initiator may be prepared as an initiator solution using a fluorohydrocarbon solvent. By way of example, 1,1,1,2,3,4,4,5,5,5-deceafluoropentane may be used as a preferred solvent, but the class of perfluorohydrocarbon solvents is not limited to this one material. The solvent dilutes the initiator, thus facilitating a uniform distibution of initiator in the reactor as is desirable for optimal polymerization in the reactor and to prevent excessive localized initiation reactions from taking place. The initiator may also be fed without a solvent or other diluent, depending upon the reaction conditions and the type of initiator. The type of initiator and the reaction conditions may cause wide variations in the self-decomposition half-life of the initiator. Therefore, the reaction temperature may be determined for optimal reaction processes to take place as well as for optimal initiator efficiency. A variety of useful initiators may be selected according to these general guidelines:

The initiator is preferably be active at the reaction temperature, for example, within the temperature ranges discussed above. A temperature at which the initiator's half-life is one hour i.e. the "one-hour half-life temperature," preferably falls within the general temperature ranges described above.

Self decomposition of the initiator preferably does not produce any fragment or byproduct that can interact with monomer, $CO_2$, or oligomers in other than free radical initiation reactions.

The tendency of initiator's chain termination is preferably low.

The initiator is preferably soluble in a supercritical fluid system of $CO_2$ and fluoroolefin, such as $VF_2$, at the concentration of use in the reaction mixture.

Suitable initiators at least include the different types of organic peroxides, namely, peroxyesters, dialkylperoxides, peroxydicarbonates, peroxyacetates, ethylhexanoates, peroxypivalates, and combinations thereof. The use of perfluorohudrocarbons is preferred because these materials do not tend to involve themselves as monomers in the polymer chain extension, which may degrade properties of the polymer in the manner of peroxides, hydroperoxides and azo compounds such as azobisisobutyronitrile of the prior art. Although any free radical initiator may be used, the fluoroperoxides are preferred, for example, to avoid gel formation where a gel is defined as a colloid in which the disperse phase has combined with the continuous phase to produce a viscous product.

Preferred initiators may include tert-butyl peroxyacetate (TBPA) and tert-butyl peroxy-2-ethylhexanoate (TBPEH). In the case of TBPA in $VF_2$ and other fluoromonomers, preferred reaction conditions include a temperature ranging from 90° to 130° C., a pressure ranging from 2000 psi to 5000 psi, and the fluoromonomer in an amount ranging from 20%–70% by weight of the reaction mixture. For TBPEH, the preferred temperature is 70–120° C., the pressure is 2,000–5,000 psi, and the monomer loading is 20–70 wt. % of the total fluid.

Table 3 shows the temperatures for 1-hour half-life and 10-hour half-life for each of these initiators. In the table, "SADT" is defined as the self-accelerating decomposition temperature.

TABLE 3

INITIATORS USED FOR THE EXPERIMENTS

| Chemical name | Product name DEGUSSA | Product name ATOFINA | SADT (° C.) | 10 hr $T_{1/2}$ (° C.) | 1 hr $T_{1/2}$ (° C.) | Formula |
|---|---|---|---|---|---|---|
| Tert-Butyl Peroxy-2-Ethylhexanoate | TBPEH | Luperox 26 | 40 | 74 | 92 | $C_{12}H_{24}O_3$ |
| TERT-BUTYL PEROXY ACETATE | TBPA-75 | LUPEROX 7M75 | 79 | 102 | 123 | $C_6H_{12}O_3$ |

There will now be shown and described a supercritical reaction system that may be used synthesize fluoropolymers, for example, in making PVDF or its copolymers using $VF_2$ monomer. The supercritical reaction system may advantageously produce fluoropolymer with very high but controllable molecular weights, a substantially unimodal molecular weight distribution, and/or low polydispersity. The synthesis proceeds from monomer or with co-monomer in a case of copolymerization. A free radical reaction mechanism proceeds in supercritical $CO_2$ as a polymerization medium, or another solvent having properties similar to those of $CO_2$. Fluoroolefins are mixed with a selected free radical initiator and, optionally, a chain transfer agent such as a HBr, HF, or HCl. The synthesis process can be carried out in a batch mode or continuously. While PVDF synthesis is particularly preferred, the general process can be applied to other fluoropolymer synthesis with similar benefits.

FIG. 1 is a schematic diagram of a supercritical $CO_2$ polymerization system 100. The major components of supercritical $CO_2$ polymerization system 100 are indicated generally as monomer feed section 101, $CO_2$ feed section 102, initiator feed section 103, reactor section 104, reactor depressurization system 105, and system ventilation section 106.

The monomer feed section 101 includes a $VF_2$ tank 107 that is placed on a digital scale 108 to monitor and/or compensate for the weight basis consumption of $VF_2$ monomer during the reaction. In order to assure an accurate real-time measurement of the mass of $VF_2$ gas, a flexible line 109 is attached to the $VF_2$ tank 107. The line 109 is flushed to remove oxygen (air) by opening the $VF_2$ supply vent valve 110, which is closed after the flushing operation. $VF_2$ then flows through a valve 111 to a pneumatically driven gas booster 112, which compresses the $VF_2$ gas to a target pressure. By way of example, the gas booster 112 may be an HG™ series gas booster obtainable on commercial order from Haskel International of Burbank, Calif. Pressure gauges 113, 114 monitor the $VF_2$ storage pressure at gauge 113 and the supply pressure from the gas booster 112 at gauge 114. A pulse dampener 115, such as a baffle or surge chamber, mitigates pressure surging from the gas booster 112. A $VF_2$ forward pressure regulator 116 controls the $VF_2$ feed pressure. A $VF_2$ feed shutoff valve 117, such as a ball valve, discharges into a $VF_2$ feed line 118. Gauge 119 monitors pressure in the $VF_2$ feed line 118.

The $CO_2$ feed section 102 commences with $CO_2$ supply tank 120. $CO_2$ flows directly to a pneumatically driven gas booster 121, which compresses $VF_2$ to a desired pressure. Compressed $CO_2$ flows through a $CO_2$ shutoff valve 122 to a pulse dampener 123 and then to a $CO_2$ forward pressure regulator 124. Pressure gauges 125, 126 monitor the $CO_2$ storage pressure at gauge 125 and the compressed supply pressure at gauge 126. Following the forward pressure regulator 124, the $CO_2$ feed tees into the $CO_2$ vent valve 127 and the $CO_2$ feed valve 128. Then, the $CO_2$ feed line 129 joins the $VF_2$ feed line 118, which jointly tee into reactor feed line 130. By this arrangement, the reactor feed line 130 charges a reactor 131 with the respective $VF_2$ and $CO_2$ flows. These respective flows may occur individually or simultaneously as the reaction proceeds in reactor 131. Gauge 132 senses pressure in the reactor feed line 130, as well as the internal pressure of the reactor 131 itself. A reactor feed valve 133 selectively isolates the reactor feed line 130 from reactor 131.

An air supply 134 may be used to drive gas boosters 112, 121 in tandem. Flow from air supply 134 may be controlled by forward pressure regulator 135, which affects the mass flow rates from gas boosters 112, 121. Gauges 136, 137 monitor pressure on either side of forward pressure regulator 135. Valves 138, 139, 140 may be used for selective isolation of air supply 134, gas booster 112 and gas booster 121, for example, to perform maintenance operations on gas booster 112 with closure of valve 139. A three way valve 141 selectively communicates $VF_2$ feed line 118 with expansion chamber 142 for expansion of $VF_2$ monomer gas prior to entry into vent line 143. Valve 144 permits selective venting of $VF_2$ feed 118 line between valve 117 and reactor feed valve 133.

The initiator feed section 103 contains an initiator or initiator solution in burette 145. The initiator is kept in burette 145 when feeding to the reactor 131 through initiator pump 146, which may be, for example, a MicroPro™ or ReciPro™ micrometering pump available on commercial order from Eldex of Napa, Calif. The initiator pump 146 delivers the initiator at pressure in metered quantities to the reactor 131. From the initiator pump 146, the initiator feed line 147 tees into the initiator purge valve 148 and the initiator feed valve 149. Once the system 100 is made-ready for the initiator to be fed to the reactor 131, the initiator pump 146 pumps the initiator through the initiator feed line 147 to fill and purge through the initiator purge valve 148. Then the initiator feeds to the reactor 131 through the initiator feed valve 149.

The reactor section 104 includes a reactor 131, which may be for example a stainless steel 300 ml bolt closure reactor equipped with a thermowell 150, two ⅛" ports 151, 152 in the lid, and two ⅛" ports 153, 154 in the body, as may be purchased on commercial order from Autoclave Engineers of Erie, Pa. The thermowell 150 may be controlled to assure that critical temperature exists within the reactor 131. An initiator feed line 155 and the reactor outlet line 156 are connected through respective ports 151, 152. The reactor feed line 130 is connected to the reactor body through port 154. Agitation to the reactor is provided through a magnetic drive impeller agitator 157. In some embodiments, the reaction mixture is suitably distributed to substantial homogeneity the action of an impeller agitator 157 driven at an impeller tip speed between 10 and 200 cm/sec.

The reactor 131 may be equipped with a rupture disk assembly 158, such as a 3/16" rupture disk rated for 6000 psi. The rupture assembly 158 may be connected to tubing 159, such as ½" tubing, that feeds into blowout drum 160. The blowout drum 160 is vented with a flexible duct 161, e.g., a 3" duct, extending to the top of system 100.

The reactor 131 may be equipped with a temperature controller 162, such as a PID™ controller from Omega Engineering, Inc. of Stamford, Conn. Heat in the thermowell 150 is provided with band heaters 163. Seven thermocouples measure the temperature at different parts of the system as follows:

Two thermocouples measure the reactor temperature: Thermocouple 164 is placed in the thermowell 150 that near the bottom of agitator 157. Thermocouple 165 is on a side-port 153 of the reactor body. A third thermocouple 166 measures the outside wall temperature of the reactor 131. For the heated reactor feed line 130 and outlet line 156, two thermocouples each may be placed at different locations, such as thermocouples 167, 168, 169, 170.

The reactor depressurization system 105 resides on reactor outlet line 156. A pressure transducer 171 may, for example, provide signal input to a PC-based pressure control and acquisition system or controller 185. During depressurization, the reactor effluent flows to a filter 172, through a three way shutoff valve 173, and then to a backpressure regulator 174, for example, an ER3000™ equipped backpressure regulator from Tescom of Elk River, Minn. The outlet of the backpressure regulator 174 tees into the vent line 143. A bypass valve 175 for the depressurization system 105 is in place as a safety precaution and may be used for rapid depressurization. The bypass valve 175 vents to the blowout drum 160. Depressurization of reactor vessel 131 may occur in one step, or in periodic increments to blow down reactor vessel 131, or with periodic $CO_2$ or air recharging of reactor vessel 131 between successive blowdowns to dry and/or purify the polymer product.

The system ventilation section 106 communicates with two vents 176, 177 that facilitate safe removal of gasses, e.g., by recycling or by flaring. An air supply 178 dispenses ventilation air into lines 179, 180 under the control of forward pressure regulators 181, 182 may be used for selective isolation of lines 179, 180. Valves 173, 183 may be selectively adjusted to provide ventilation air in lines 179, 180. A combustible gas monitor 184 monitors the $VF_2$ concentration in air to warn if there is a leak of combustible gas from system 100.

A controller 185 may govern the operation of system components, as discussed above. Alternatively, system 100 may be operated by hand. Signal communications with controller 185 may be wireless communications with operations control signals emanating from controller 185 and data input signals emanating from system components, as needed for the implementation of process control. Suitable process controls according to these instrumentalities may be implemented by program instructions on any programmable controller, in a single processor environment, in a multiple processor environment, in a distributed processing environment, and/or in a network of process equipment that may be connected by optical, digital, analog, radio, pressure, or other types of signals for the cooperative communication of control signals and data.

Vents 176, 177, 186 and purge 187 discharge into environmentally safe systems for disposal or recycle of materials.

WORKING EXAMPLES

The supercritical polymerization system 100 shown in FIG. 1 was used to polymerize $VF_2$ in a variety of working examples, as described below. To commence each polymerization run, the reactor 131 was cleaned and bolted down. A pressure test was performed with $CO_2$ at 600 psi. Oxygen from the reactor 131 was purged with $CO_2$ by four pressurization-depressurization cycles from 600 psi to 25 psi. After that, the reactor 131 was pressurized with $CO_2$ to the desired pressure condition and simultaneously heated to the reaction temperature. The magnetic drive impeller agitator 157 was turned on and maintained at a selected rate (e.g., 0, 150, 250, 500 rpm) throughout the reaction.

The $VF_2$ line 118 exiting the gas booster 112 and connecting to the reactor feed valve 133 was purged by five pressurization-depressurization cycles from 400 psi to 25 psi before feeding of $VF_2$ to the reactor 131. $CO_2$ was added to the reactor 131 from the $CO_2$ feed line 129. Thermowell 150 was energized to achieve a desired temperature, and the $CO_2$ content of reactor 131 was adjusted to achieve the desired temperature and pressure. When the reactor 131 conditions stabilized at the desired reaction temperature and $CO_2$ pressure, $VF_2$ was added to the reactor 131 via $VF_2$ feed valve 117 to take the reactor pressure to the predetermined total reaction pressure as indicated by gauge 132. The $VF_2$ feed valve 117 was then closed. The $VF_2$ digital scale 108 was read before feeding the reactor 131 to determine the mass flow into reactor 131.

As shown, reactor 131 is in the form of a continuously stirred batch reactor, the setup as shown may be operated in the mode of a continuous reactor by continuously or periodically performing a partial blowdown into filter 172 for recovery of polymer product where blowdown venting occurs from the bottom of reactor 131. Furthermore, vent 176 and/or vent 177 may be subjected to recycle by the action of an additional gas booster (not shown) discharging into reactor feed line 130. Alternatively, the reactor vessel may be configured as a continuous reactor, for example, as shown in U.S. Pat. No. 6,051,682, which is hereby incorporated by reference to the same extent as though fully replicated herein.

Preparation of the initiator solution in burette 145 was done as follows: 2–3 ml of 1,1,1,2,3,4,4,5,5,5-decafluoropentane solvent was put in a 25 ml burette, followed by the addition of a desired initiator amount with a 5 ml pipette. Solvent was again added to obtain the final initiator solution amount. Initiator solution was fed to the reactor by actuation of micrometering initiator pump 146. Before the initiator solution was fed, the initiator line 147 was purged three times; each time with approximately 2–3 ml of the same initiator solution used for the experiment. The final purge was done when the system was stable, i.e., at the desired reaction temperature and pressure.

During initiator feeding, readings of the initiator solution level in the burette, temperature and reactor pressure were recorded at one-minute intervals. A predetermined amount of initiator solution was fed into the reactor. After the initiator was fed, the initiator feed line 147 was closed at valve 149 and the injector pump 146 was purged twice with 2–3 ml of solvent through valve 148. An additional 0.7 ml of solvent was fed to the reactor 131 to purge any remaining initiator in the initiator feed line 147.

Total initiator solution as initiator plus solvent fed to the reactor 131 was, for example, between 3.7 and 4.2 ml. The amount of solvent used ranged from 2.7 to 3.7 ml. The final purge step involved adding 0.5–0.7 ml pure solvent to flush the initiator feed line 147 into the reactor 131. Typical feed times for the initiator solution were 3–5 minutes. The final purge was generally completed within 5 minutes of the completion of the feeding of the initiator.

The reaction rate was monitored by observing the pressure in the reactor. As the monomer was consumed, the pressure decreased. $VF_2$ was fed through $VF_2$ feed line 117 and reactor feed line 130 to maintain the reaction pressure after monomer consumption was observed in the pressure profile signaled by gauge 132 while the reaction proceeded. The reaction was carried out for the desired amount of time, typically ranging between 0.5 and 6 hours. At the end of each run, the reactor 131 was depressurized and allowed to cool. This depressurization in effect quenched the reaction.

At the end of the reaction time, the agitator 152 was turned off. The reactor 131 was then depressurized over 30 minutes using a pressure control system located in the reactor outlet line 156 under automated control of controller 185. After allowing the reactor to cool, the reactor 131 was opened and the polymer was collected. Polymer from the thimble, shaft, and impeller of actuator 152 was collected separately from the polymer between the thimble and the inside wall of reactor. Samples were sent to the Atofina's King of Prussia Research Center in King of Prussia, Pa., on commercial services order for molecular weight determination and digital scanning calorimetry (DSC) analysis.

The following examples set forth preferred materials and methods for making PVDF from $VF_2$ monomer, but the concepts described herein also apply to comonomers including, for example, $VF_2$-TFE and other comonomers discussed above. The following three initiators were used. All polymerization reactions were carried out in a 300-ml bolt-closure stirred autoclave reactor.

Examples 1–6 are for tert-butyl peroxyacetate (TBPA) at different reaction conditions Examples 7–8 are for tert-butyl peroxy-2-ethylhexanoate (TBPEH) at different reaction conditions A summary table of the process conditions as well as product characterization for all the examples is shown in Table 4.

that molecular weight may be altered by selection of a different initiator and use of a reaction temperature favorable to persistence of that initiator in the reaction mixture.

EXAMPLE 1

The operating temperature was 104° C. and the pressure was 3503 psi. The initiator used was tert-butyl peroxyacetate and the total loading quantity of the initiator was 0.09 ml (STP). Vinylidene fluoride concentration was 0.28 g/ml and carbon dioxide concentration was 0.31 g/ml for a total concentration of 0.59 g/ml inside the reactor. Agitation rate in the reactor was maintained at 500 rpm. The polymerization reaction was carried out for 180 minutes.

Figure 2:
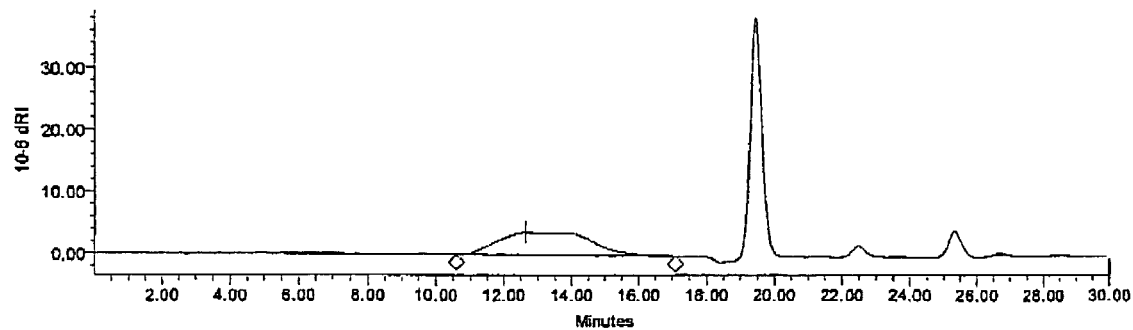
FIG. 2 is an autoscaled chromatogram analyzing polymer from a PVDF production run.
Figure 3:
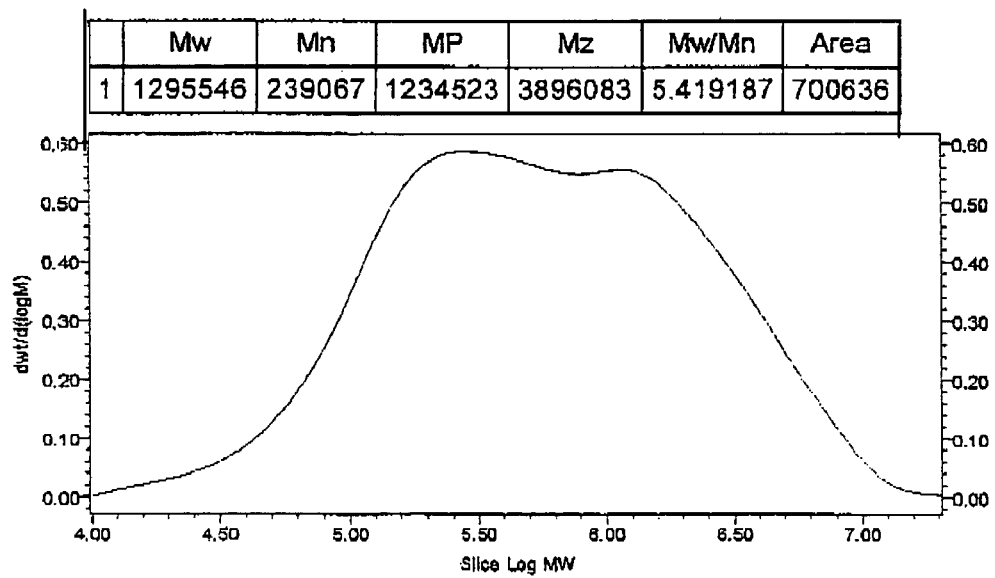
FIG. 3 is a high-temperature gel permeation chromatography plot for a PVDF polymer subjected to the chromatogram of FIG. 2 showing a polymer molecular weight analysis.

Polyvinylidenefluoride (PVDF) product was recovered, in quantity of 37.8 g, The weight average molecular weight (Mw) was approximately 1,300,000 g/mol within polydispersity index of 5.4. FIG. 2 shows an auto-scaled chromatogram for this polymer product in DMSO solvent, and FIG. 3 the associated high-temperature gel permeation chromatography plot for this polymer product. FIG. 3 shows weight average molecuar weight (MW), number average molecular weight (Mn), peak average molecular weight (Mp), z-average molecular weight (Mz), polydispersity index as Mw/Mn, and integrated area under a curve plotted as log molecular weight (X-axis) versus the derivative of weight instance taken with respect to log molecular weight. The melting temperature of the polymer was determined to be 166.1° C., the degree of crystallinity was 48.9 percent and the bulk density of the product polymer was 0.15 g/ml.

EXAMPLE 2

Operating conditions were identical to those of Example 1, except that the reaction time was 90 min and the agitation rate was 250 rpm. The operating temperature was 104° C.

TABLE 4

SUMMARY OF PROCESS CONDITIONS AND PRODUCT CHARACTERIZATION

| Ex # | Run# | Initiator | (ml) | Temp (C.) | Pressure (psi) | $VF_2$ Density (g/ml) | Mw (g/mol) | PD | Melting Enthalpy (J/g) | $T_{m1}$ (C.) | $T_{m2}$ (C.) | Deg of Crystallinity (%) |
|---|---|---|---|---|---|---|---|---|---|---|---|---|
| 1 | 28 | TBPA-75 | 0.09 | 104 | 3500 | 0.28 | 1,300,000 | 5.4 | 51.1 | 166.1 | — | 49 |
| 2 | 40 | TBPA-75 | 0.09 | 105 | 3525 | 0.30 | 547,000 | 3.2 | — | 165.5 | — | 50 |
| 3 | 29 | TBPA-75 | 0.03 | 104 | 3495 | 0.29 | 1,173,000 | 3.9 | — | 165.2 | — | 51 |
| 4 | 23 | TBPA-75 | 0.15 | 104 | 3933 | 0.27 | 967,000 | 4.4 | 52.3 | 165.8 | — | 50 |
| 5 | 18 | TBPA-75 | 0.60 | 105 | 4030 | 0.21 | 195,700 | 2.8 | 58.8 | 163.3 | 168.1 | 56 |
| 6 | 39 | TBPA-75 | 0.09 | 105 | 3285 | 0.28 | 838,000 | 3.9 | — | 163.6 | — | 50 |
| 7 | 36 | TBPEH | 0.60 | 84 | 3797 | 0.30 | 284,000 | 2.6 | — | 170.3 | — | 57 |
| 8 | 32 | TBPEH | 0.30 | 76 | 3260 | 0.30 | 117,000 | 2.2 | — | 168.0 | 172.4 | 60 |

Analysis of Table 4 shows that the polymer reaction product morphology is generally crystalline, with a degree of crystallinity indicated as being about 50% or greater where the polymer samples were analyzed by melting enthalpy to determine crystallinity. Polydispersity shown as "PD" is more difficult to control with increasing molecular weight. Molecular weight is controllable by limiting the reaction time, for example, as shown by comparison between Examples 1 and 2 where the molecular weight of 1,300,000 in Example 1 was reduced in Example 2 to 547,000, primarily by the simple expedient of reducing the reaction time from 180 minutes in run 28 to 90 minutes in Example 2. A comparison between Examples 5 and 7 shows and the pressure was 3525 psi. The initiator used was tert-butyl peroxyacetate and the total loading quantity of the initiator was 0.09 ml (STP). Vinylidene fluoride concentration was 0.30 g/ml and carbon dioxide concentration was 0.31 g/ml for a total concentration of 0.61 g/ml inside the reactor.

Figure 4:
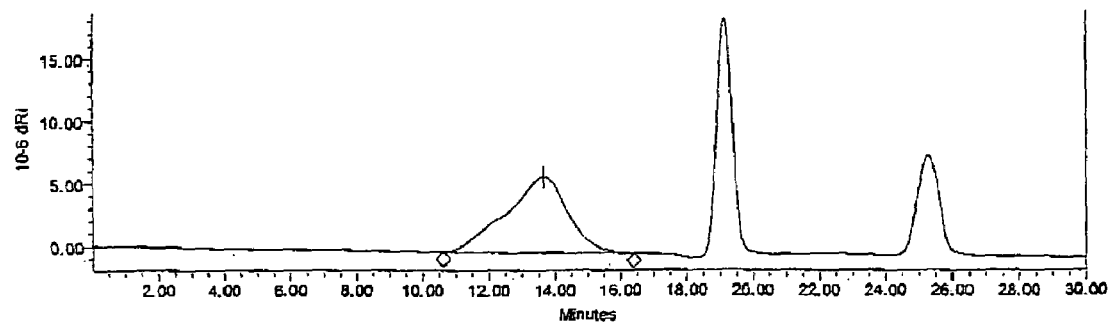
FIG. 4 is an autoscaled chromatogram analyzing polymer from a PVDF production run.
Figure 5:
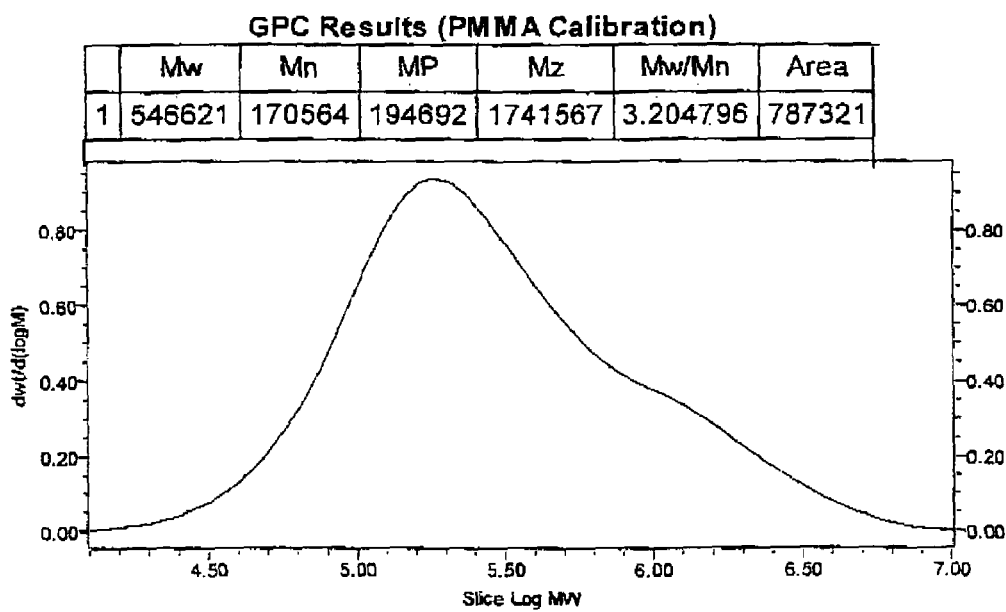
FIG. 5 is a high-temperature gel permeation chromatography plot for a PVDF polymer subjected to the chromatogram of FIG. 4 showing a polymer molecular weight analysis.

Polyvinylidenefluoride (PVDF) product was recovered, in quantity of 9.8 g. The weight average molecular weight (Mw) was approximately 547,600 g/mol with a polydispersity index of 3.2. FIG. 4 shows an auto-scaled chromatogram for this polymer product in DMSO solvent, and FIG. 5 the associated high-temperature gel permeation chromatography plot for this polymer product. The melting temperature of the polymer was determined to be 165.5° C., the degree of crystallinity was 49.8 percent and the bulk density of the product powder was 0.08 g/ml.

EXAMPLE 3

The operating temperature was 104° C. and the pressure was 3495 psi. The initiator used was tert-butyl peroxyacetate and the total loading quantity of the initiator was 0.03 ml. Vinylidene fluoride concentration was 0.29 g/ml and carbon dioxide concentration was 0.31 g/ml for a total concentration of 0.60 g/ml inside the reactor. Agitation rate in the reactor was maintained at 500 rpm. The polymerization reaction was carried out for 180 minutes.

Figure 6:
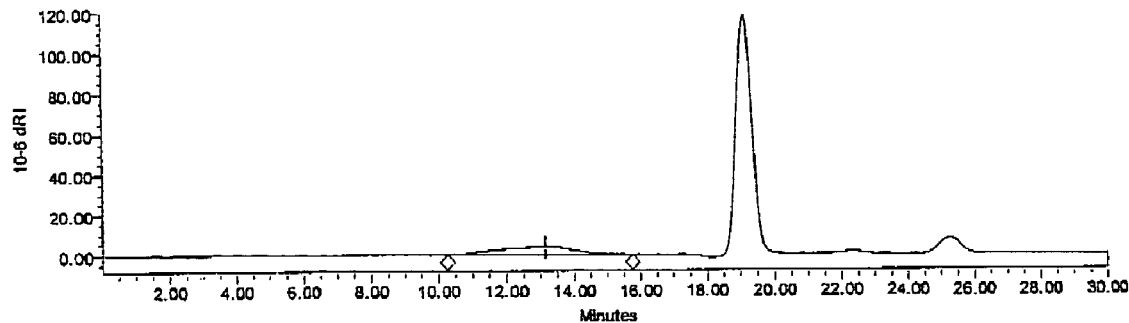
FIG. 6 is an autoscaled chromatogram analyzing polymer from a PVDF production run.
Figure 7:
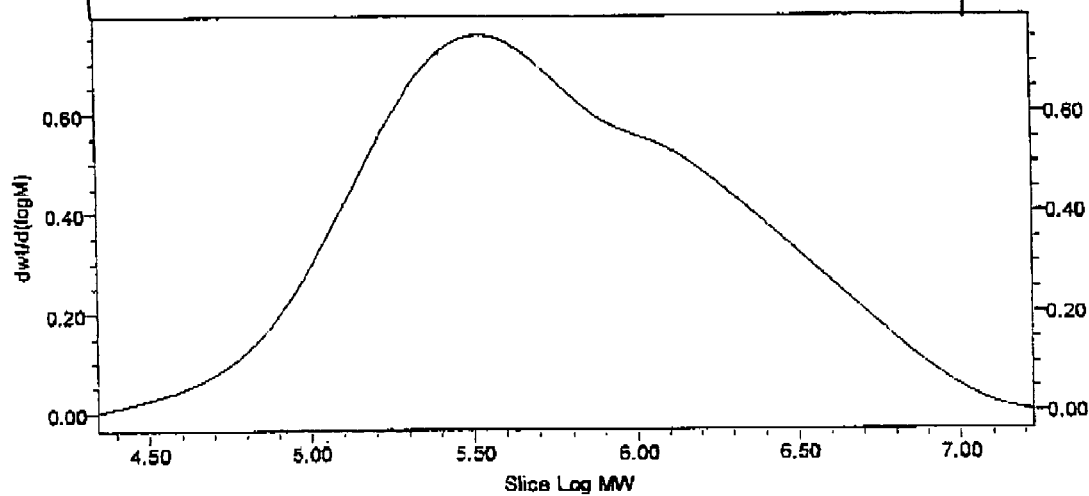
FIG. 7 is a high-temperature gel permeation chromatography plot for a PVDF polymer subjected to the chromatogram of FIG. 6 showing a polymer molecular weight analysis.

Polyvinylidenefluoride (PVDF) product was recovered in quantity of 14.9 g. The weight average molecular weight (Mw) was approximately 1,173,000 g/mol with a polydispersity index of 3.9. FIG. 6 shows an auto-scaled chromatogram for this polymer product in DMSO solvent, and FIG. 7 the associated high-temperature gel permeation chromatography plot for this polymer product. The melting temperature of the polymer was determined to be 165.2° C., the degree of crystallinity was 50.6 percent and the bulk density of the polymer product was 0.09 g/ml.

EXAMPLE 4

The operating temperature was 104° C. and the pressure was 3933 psi. The initiator used was tert-butyl peroxyacetate and the total loading quantity of the initiator was 0.15 ml. Vinylidene fluoride concentration was 0.27 g/ml and carbon dioxide concentration was 0.37 g/ml for a total concentration of 0.64 g/ml inside the reactor. Agitation rate in the reactor was maintained at 500 rpm. The polymerization reaction was carried out for 180 minutes.

Figure 8:
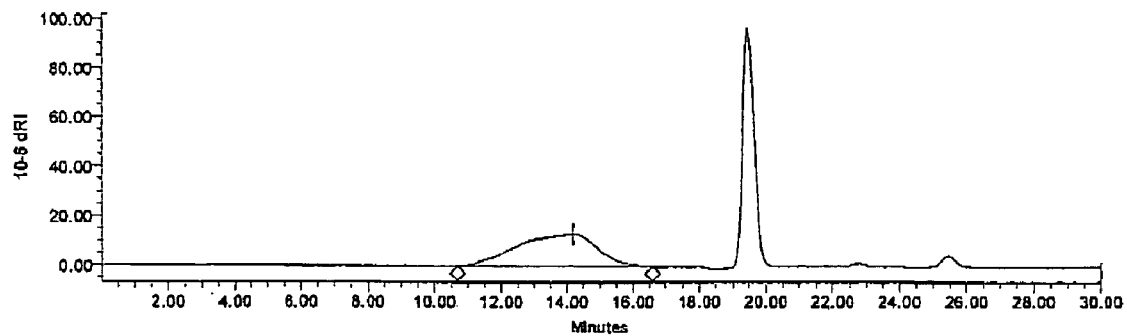
FIG. 8 is an autoscaled chromatogram analyzing polymer from a PVDF production run.
Figure 9:
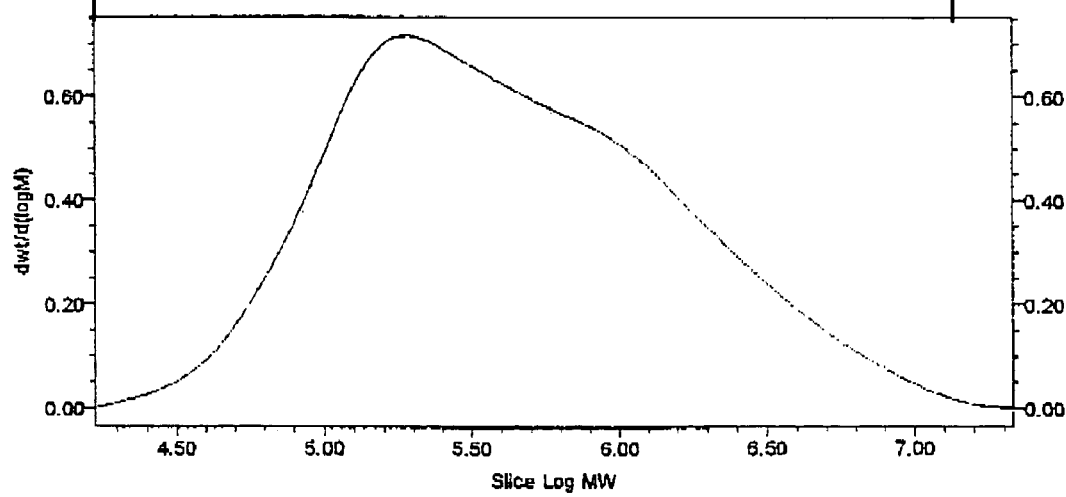
FIG. 9 is a high-temperature gel permeation chromatography plot for a PVDF polymer subjected to the chromatogram of FIG. 8 showing a polymer molecular weight analysis.

Polyvinylidenefluoride (PVDF) product was formed, in quantity of 26.1 g. The weight average molecular weight (Mw) was approximately 967,000 g/mol with a polydispersity index of 4.4. FIG. 8 shows an auto-scaled chromatogram for this polymer product in DMSO solvent, and FIG. 9 the associated high-temperature gel permeation chromatography plot for this polymer product. The melting temperature of the polymer was determined to be 165.8° C. the degree of crystallinity was 50.0 percent and the bulk density of the product polymer was 0.14 g/ml.

EXAMPLE 5

The operating temperature was 104° C. and the pressure was 4030 psi. The initiator used was tert-butyl peroxyacetate and the total loading quantity of the initiator was 0.6 ml. Vinylidene fluoride concentration was 0.21 g/ml and carbon dioxide concentration was 0.42 g/ml for a total concentration of 0.63 g/ml inside the reactor. Agitation rate in the reactor was maintained at 500 rpm. The polymerization reaction was carried out for 180 minutes.

Figure 10:
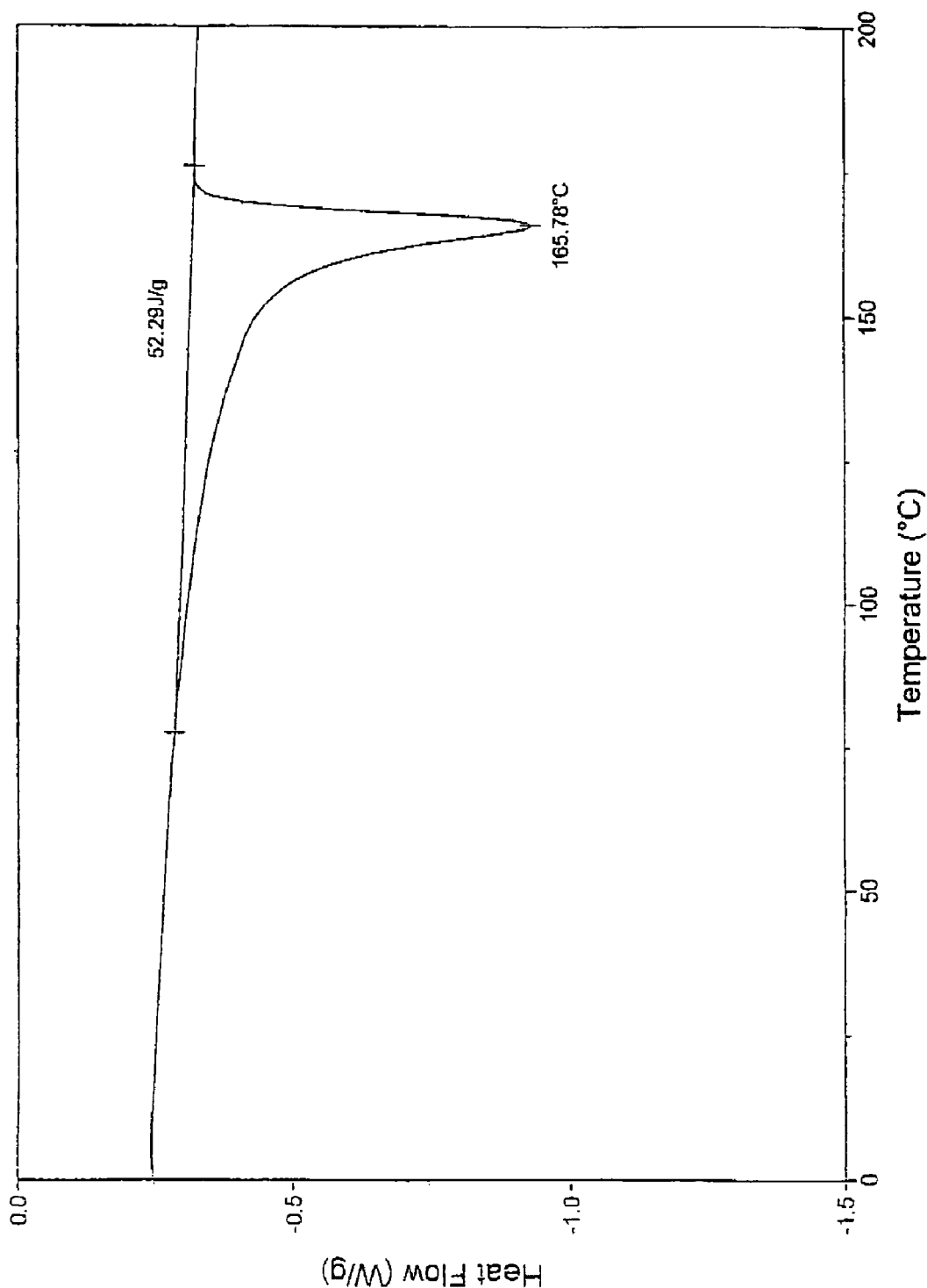
FIG. 10 is a digital scanning calorimetry plot of a PVDF polymer product showing a melting temperature.

Polyvinylidenefluoride (PVDF) product was recovered in quantity of 32.8 g. The weight average molecular weight (Mw) was 195,700 g/mol with a polydispersity index of 2.8. FIG. 10 shows the differential scanning calorimetry analysis for this polymer product. The melting temperatures of the polymer were determined to be 163.2° C. and 168.1° C. the degree of crystallinity was 56.0 percent and the bulk density was 0.19 g/ml. The lower melting point is due to the lower molecular weight fraction of the polymer where chain growth was terminated by stoppage of the fixed-time experimental reaction.

EXAMPLE 6

The operating temperature was 104° C. and the pressure was 3285 psi. The initiator used was tert-butyl peroxyacetate and the total loading quantity of the initiator was 0.09 ml. Vinylidene fluoride concentration was 0.28 g/ml and carbon dioxide concentration was 0.29 g/ml for a total concentration of 0.57 g/ml inside the reactor. Agitation rate in the reactor was maintained at 250 rpm. The polymerization reaction was carrier out for 180 minutes, in this experiment, vinylidenefluoride was added only for the first 90 minutes and the reaction pressure was allowed to decrease with consumption of the monomer.

Figure 11:
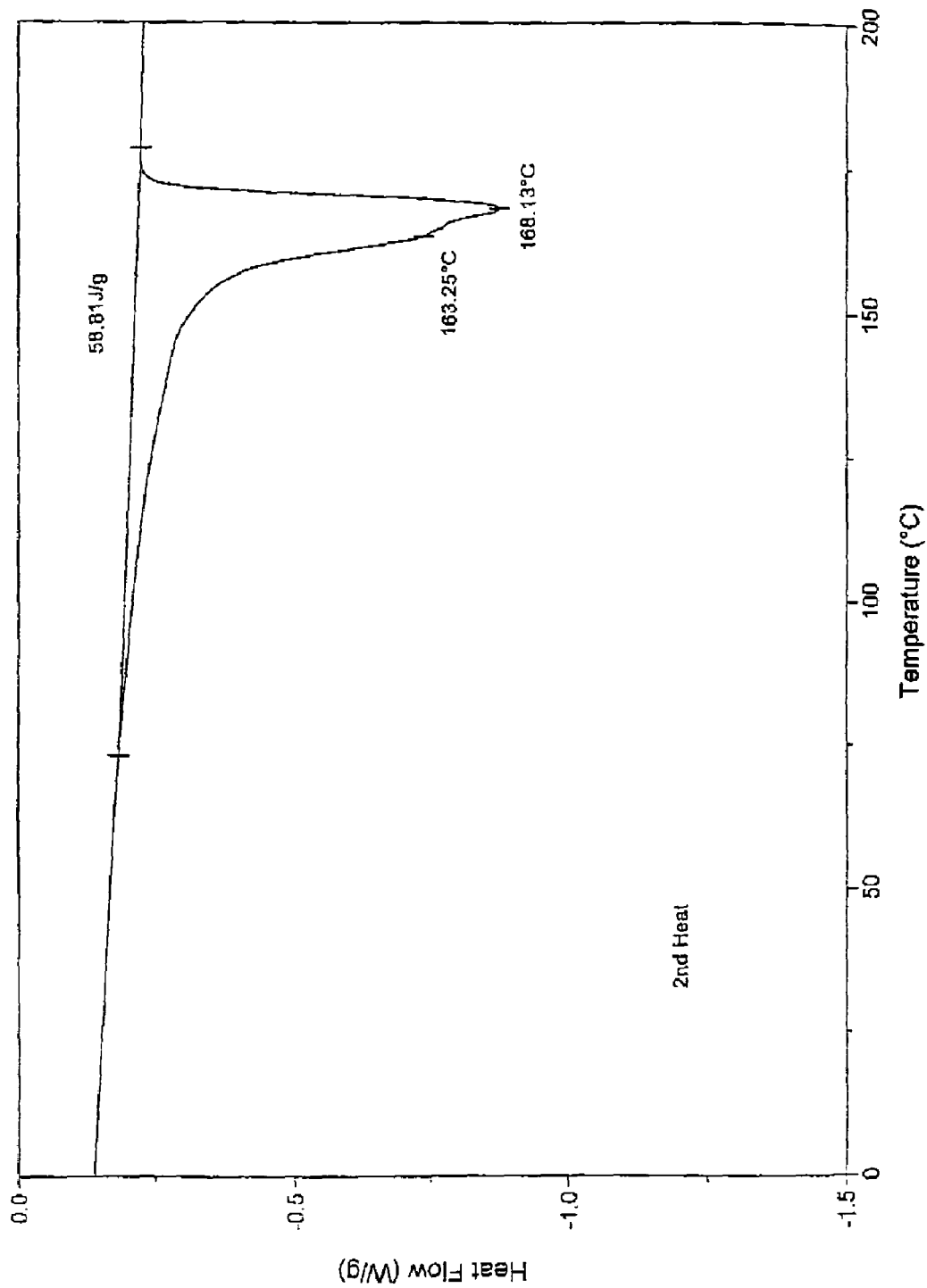
FIG. 11 is a digital scanning calorimetry plot of a PVDF polymer product showing a melting temperature.
Figure 12:
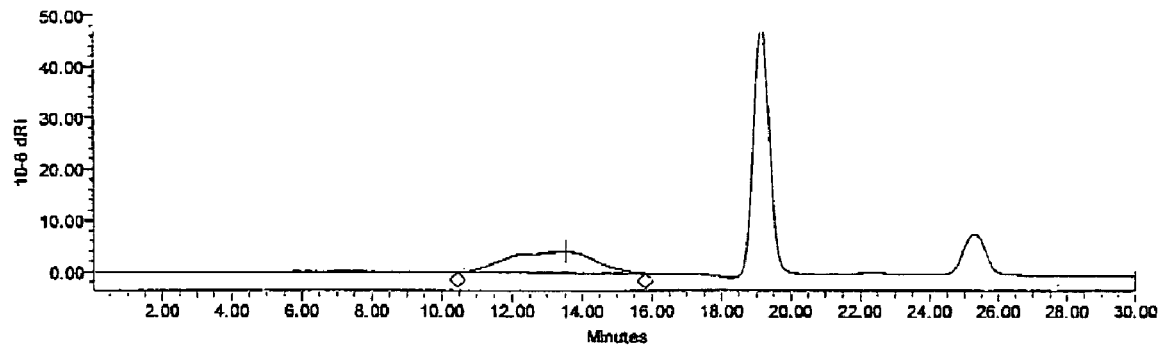
FIG. 12 is an autoscaled chromatogram analyzing polymer from a PVDF production run.
Figure 13:
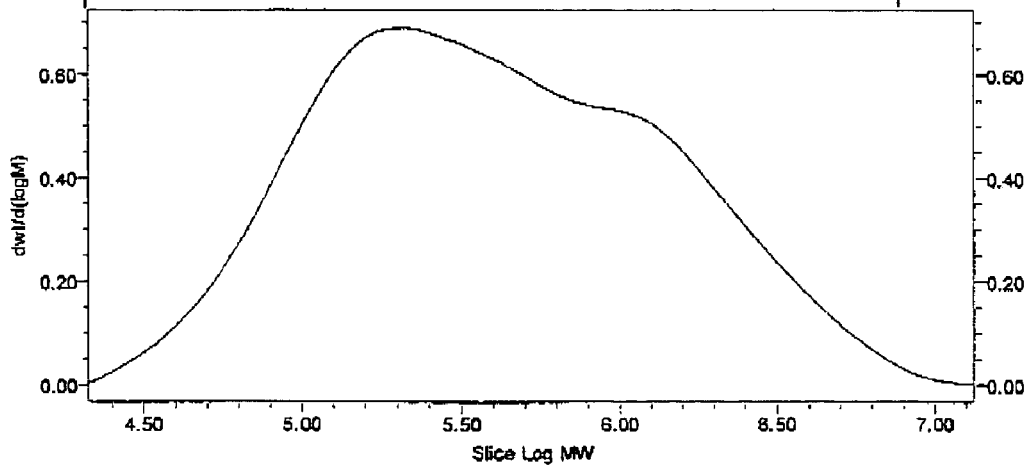
FIG. 13 is a high-temperature gel permeation chromatography plot for a PVDF polymer subjected to the chromatogram of FIG. 12 showing a polymer molecular weight analysis.

Polyvinylidenefluoride (PVDF) product was recovered in quantity of 30.4 g. The weight average molecular weight (Mw) was 838,000 g/mol with a polydispersity index of 3.9. FIG. 11 shows the differential scanning calorimetry analysis for this polymer product. The melting temperature of the polymer was determined to be 153.6° C. the degree of crystallinity was 49.6 percent and the bulk density of the polymer product was 0.17 g/ml. FIG. 12 shows an auto-scaled chromatogram for this polymer product in DMSO solvent, and FIG. 13 the associated high-temperature gel permeation chromatography plot for this polymer product.

EXAMPLE 7

The operating temperature was 84° C. and the pressure was 3797 psi. The initiator used was tert-butyl peroxy-2-ethylhexanoate and the total loading quantity of the initiator was 0.6 ml. Vinylidene fluoride concentration was 0.30 g/ml and carbon dioxide concentration was 0.40 g/ml for a total concentration of 0.70 g/ml inside the reactor. Agitation rate in the reactor was maintained at 250 rpm. The polymerization reaction was carried out for 180 minutes.

Figure 14:
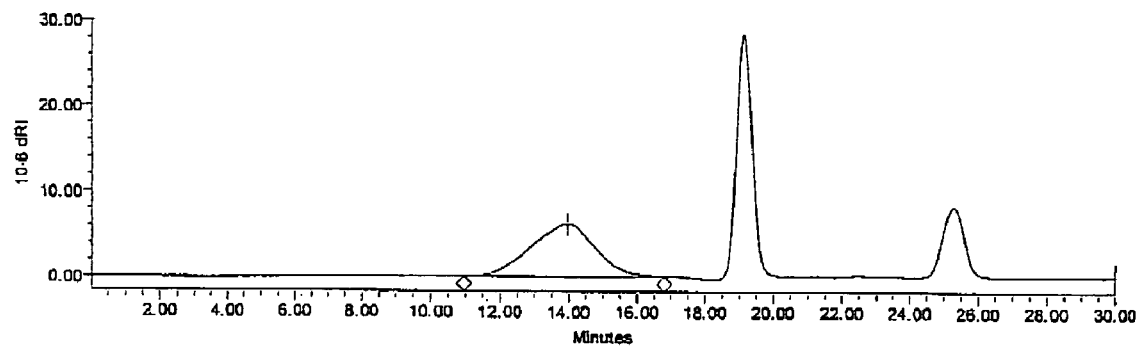
FIG. 14 is an autoscaled chromatogram analyzing polymer from a PVDF production run.
Figure 15:
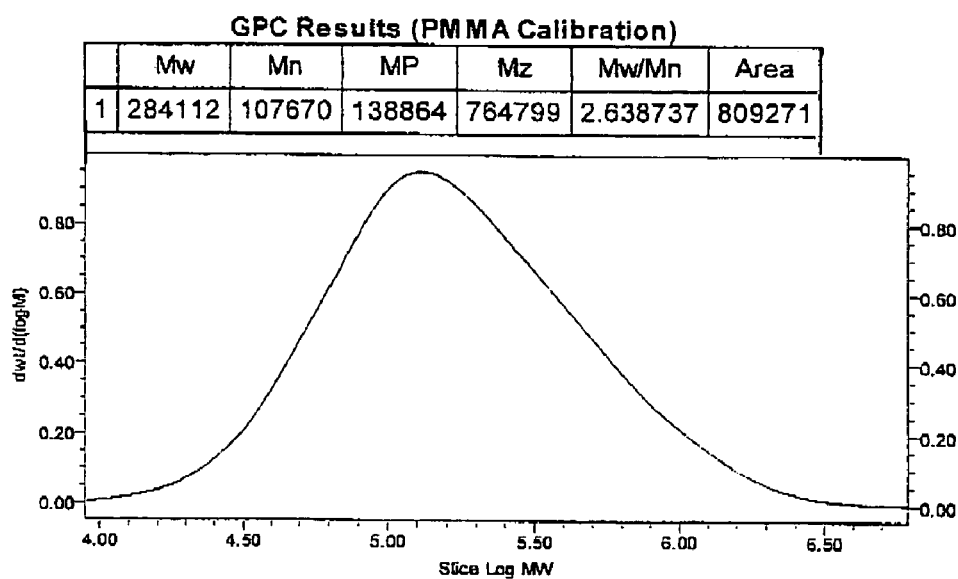
FIG. 15 is a high-temperature gel permeation chromatography plot for a PVDF polymer subjected to the chromatogram of FIG. 14 showing a polymer molecular weight analysis.

Polyvinlidenefluoride (PVDF) product was recovered in quantity of 14.5 g. The weight average molecular weight (Mw) was 284,000 g/mol with a polydispersity index of 2.6. FIG. 14 shows an auto-scaled chromatogram for this polymer product in DMSO solvent, and FIG. 15 the associated high-temperature gel permeation chromatography plot for this polymer product. The melting temperature of the polymer was determined to be 170.3° C., the degree of crystallinity was 56.9 percent and the bulk density of the polymer product was 0.08 g/ml.

EXAMPLE 8

The operating temperature was 84° C. and the pressure was 3260 psi. The initiator used was tert-butyl peroxy-2-ethylhexanoate and the total loading quantity of the initiator was 0.6 ml. Vinylidene fluoride concentration was 0.30 g/ml and carbon dioxide concentration was 0.35 g/ml for a total concentration of 0.65 g/ml inside the reactor. Agitation rate in the reactor was maintained at 250 rpm. The polymerization reaction was carried out for 180 minutes.

Figure 16:
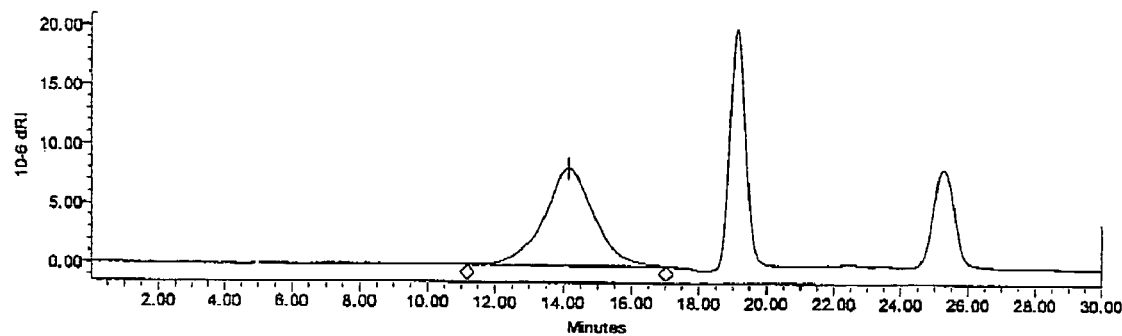
FIG. 16 is an autoscaled chromatogram analyzing polymer from a PVDF production run.
Figure 17:
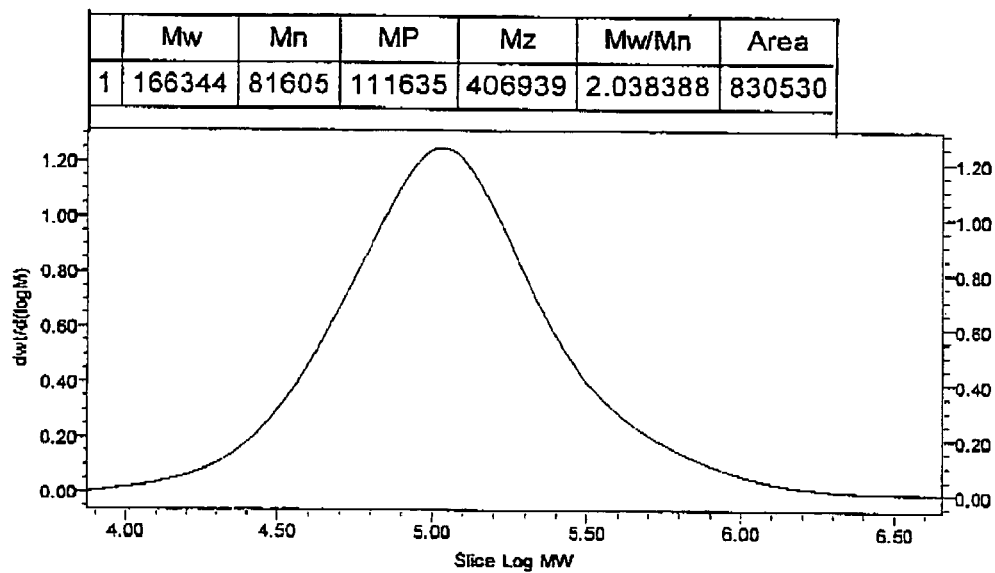
FIG. 17 is a high-temperature gel permeation chromatography plot for a PVDF polymer subjected to the chromatogram of FIG. 16 showing a polymer molecular weight analysis.

Polyvinylidenefluoride (PVDF) product was recovered in quantity of 19.6 g. The weight average molecular weight (Mw) was 117,000 g/mol with a polydispersity index of 2.2. FIG. 16 shows an auto-scaled chromatogram for this polymer product in DMSO solvent, and FIG. 17 the associated high-temperature gel permeation chromatography plot for this polymer product. The melting temperatures of the polymer were determined to be 168.0° C. and 172.4° C., the degree of crystallinity was 60.2 percent.

REFERENCES

The references are incorporated by reference herein.

U.S. Pat. Nos. 5,618,894; 5,674,957; 5,939,501; 5,939,502; 5,981,673. Nonaqueous polymerization of fluoromonomers. DeSimone, J. M.; Romack, T.

U.S. Pat. No. 6,340,722. Polymerization, compatibilized blending, and particle size control of powder coatings in a supercritical fluid. Lee, Sunggyu; Lanterman, H. Bryan.

U.S. Pat. Nos. 5,496,901; 5,688,879; 5,739,223; 5,863,612; 5,922,833. Method of Making Fluoropolymers. DeSimone, J. M.

U.S. Patent Application 2002/0040118A1, Multimodal Fluoropolymers and Methods of Making the Same. DeSimone, J. M., Roberts, G. W., and Charpentier, P. A.

The invention claimed is:

1. A process for reacting fluoroolefin to form a polymer, comprising the steps of:
    feeding solvent to a reactor vessel, the solvent being essentially non-reactive with the fluoroolefin and having a critical temperature less than a melting point of the polymer;
    supplying at least one fluoroolefin monomer to the reactor vessel so that at completion of the feeding and supplying steps total monomer concentration is at least twenty percent by weight of a monomer-carbon dioxide mixture;
    establishing reaction conditions inside the reactor vessel to provide a reactive state for a polymerization reaction such that temperature is above a critical temperature of the solvent arid less than a melting point of a desired polymer product, and pressure ranges from 50 atm to 450 atm;
    introducing an initiator into the reactor vessel to form a reaction mixture;
    reacting the reaction mixture in the reactive state to effect free radical polymerization and form a polymer; and
    depressurizing the reactor vessel to recover the polymer, wherein said polymer has a unimodal molecular weight distribution with a low polydispersity index ranging from 1.3 to 6.0.

2. The process according to claim 1, wherein the fluoroolefin monomer used in the supplying step includes vinylidene fluoride.

3. The process according to claim 2, wherein the fluoroolefin monomer consists essentially of the vinylidene fluoride.

4. The process according to claim 2, wherein the fluoroolefin monomer includes the vinylidene fluoride in combination with a comonomer.

5. The process according to claim 1, wherein the fluoroolefin monomer used in the supplying step is a single fluoroolefin monomer.

6. The process according to claim 1, wherein the fluoroolefin monomer used in the supplying step is present in combination with at least one comonomer.

7. The process according to claim 1, wherein the solvent used in the feeding step comprises carbon dioxide.

8. The process according to claim 1, wherein the reactive state of the establishing step imposes conditions sufficient to present vinylidene fluoride and carbon dioxide as a supercritical binary mixture.

9. The process according to claim 1, wherein the initiator used in the introducing step initiates free radicals of the fluoroolefin monomer but is nonreactive with carbon dioxide.

10. The process according to claim 1, wherein the step of reacting is performed in a batch mode.

11. The process according to claim 1, wherein the step of reacting is performed with use of a continuous reactor.

12. The process according to claim 1, wherein the solvent used in the feeding step a) comprises carbon dioxide, and the reactive state of the establishing step includes a temperature ranging from 31° C. to 165° C.

13. The process according to claim 1, wherein the reactive state established in the step of establishing includes a pressure ranging from 675 psi to 5,000 psi.

14. The process according to claim 1, wherein the fluoroolefin monomer used in the supplying step includes vinylidene fluoride in the reactor exceeding 0.1 g/cc.

15. The process according to claim 1, further comprising a step of providing a chain transfer agent prior to the reacting step.

16. The process according to claim 1, wherein the step of reacting comprises agitating the reaction mixture.

17. The process according to claim 1, wherein the reactor vessel is a batch reactor and the reacting step is performed over an interval ranging from 10 minutes to 300 minutes.

18. The process according to claim 1, wherein the reactor vessel is a continuous reactor and the reacting step e) is performed over an interval ranging from 10 minutes to 300 minutes.

19. The process according to claim 1, wherein the depressurizing step includes a controlled depressurization process comprised of systematic repetition of cooling and venting steps.

20. The process according to claim 1, wherein the fluoroolefin monomer used in the supplying step includes vinylidene fluoride in an amount ranging from 10 wt. % to 70 wt. %.

21. The process according to claim 1, wherein the initiator used in the introducing step is a thermally activated initiator that self-decomposes with a half life ranging from 15 minutes to two-hours at a temperature ranging from 31° C. and about 165° C.

22. The process according to claim 1, wherein the initiator used in the introducing step is selected from the group consisting of organic peroxides; dialkylperoxides, peroxyesters, peroxydicarbonates, peroxyacetates, ethylhexanoates, peroxypivalate, and combinations thereof.

23. The process according to claim 22, wherein the introducing step includes introducing the initiator as a diluted solution that includes the initiator and a solvent.

24. The process according to claim 22, wherein the introducing step d) includes introducing the initiator without dilution.

25. The process according to claim 1, wherein the reactor vessel is a continuous reactor and there is concurrent performance of the introducing step, the supplying step and the reacting step.

26. The process according to claim 2, wherein the amount of initiator is between 0.005 mole % and 3.0 mole % of the vinylidene fluoride monomer fed into the reactor.

27. The process according to claim 1, wherein the reactor vessel is a continuous reactor and the reacting step comprises continuously reacting with facilitation by at least one of a depressurization chamber, an expansion zone and a solid product filter downstream of the reactor vessel.

28. The process according to claim 1, wherein the reacting step includes distributing the reaction mixture by the action of an impeller agitator driven a, an impeller up speed between 10 and 200 cm/sec.

29. The process according to claim 1, wherein the depressurizing step is performed over a time period ranging from 1 to 120 minutes.

30. The process according to claim 1, wherein the polymer yield from the reacting step without recycle of monomer reagent equals or exceeds 40% percent of the total monomer fed into the reactor vessel in the supplying step.

31. The process according to claim 1, polymer yield from the reacting step without recycle of monomer reagent equals or exceeds 90 percent of the total monomer fed into the reactor into the reactor vessel in the supplying step.

32. The process according to claim 1, wherein the product polymer obtained from the depressurizing step comprises a free flowing powder and its agglomerate free of gel or microgel.

33. The process according to claim 1, wherein the product polymer obtained from the depressurizing step comprises a high molecular weight material ranging from 150,000, 1,500,000 and its molecular weight is unimodally distributed with a polydispersity index ranging from 1.3 to 6.0.

34. A process according to claim 1, wherein the depressurizing step provides a polymer product with a molecular weight ranging from 150,000 to 1,500,000 g/mol that is selectively controlled by selecting conditions of the reactive state in the establishing step, by selecting varying the type and amount of initiator used in the introducing step, and by selectively adjusting the total monomer concentration in the supplying step.

35. The process according to claim 1, wherein the product polymer obtained from the depressuring step has a crystallinity is in excess of 40%.

36. The process according to claim 1, wherein the product polymer obtained from the depressuring step has a high melting point in excess of 160° C.

37. A process according to claim 1, wherein the initiator used in the introducing step comprises tert-butyl peroxyacetate, and the reactive state of the establishing step includes a temperature ranging from 90° to 130° C., a pressure ranging from 2000 psi to 5000 psi, and the fluoroolefin used in the supplying step includes vinylidene fluoride in an amount ranging from 20%–70% by weight of the reaction mixture.

38. The process according to claim 1, wherein the initiator used in the introducing step d) comprises tert-butyl peroxy-2-ethylhexanoate, and the reactive state of the establishing step includes a temperature ranging from 70° to 120° C., a pressure ranging front 2000 psi to 5000 psi, and the fluoroolefin used in the supplying step includes vinylidene fluoride in on amount ranging from 20%–70% by weight of the reaction mixture.

39. The process according to claim 1, the introducing step includes mixing the initiator with a solvent comprising a fluorohydrocarbon.

40. The process according to claim 39, wherein the fluorohydrocarbon comprises 1,1,1,2,3,4,4,5,5,5-decafluoropentane.

41. A product produced by the process according to claim 1.

* * * * *